US012555806B2

(12) United States Patent
Berger et al.

(10) Patent No.: US 12,555,806 B2
(45) Date of Patent: Feb. 17, 2026

(54) FUEL CELL STACK HAVING A SENSOR, AND METHOD USED FOR PRODUCING A FUEL CELL STACK HAVING THE SENSOR

(71) Applicant: Robert Bosch GmbH, Stuttgart (DE)

(72) Inventors: Markus Berger, Vaihingen An der Enz (DE); Stefan Elser, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 490 days.

(21) Appl. No.: 18/245,010

(22) PCT Filed: Aug. 4, 2021

(86) PCT No.: PCT/EP2021/071725
§ 371 (c)(1),
(2) Date: Mar. 13, 2023

(87) PCT Pub. No.: WO2022/058086
PCT Pub. Date: Mar. 24, 2022

(65) Prior Publication Data
US 2023/0361324 A1    Nov. 9, 2023

(30) Foreign Application Priority Data

Sep. 15, 2020   (DE) ............... 10 2020 211 530.3

(51) Int. Cl.
*H01M 8/0432*   (2016.01)
*H01M 8/0258*   (2016.01)
(Continued)

(52) U.S. Cl.
CPC ..... *H01M 8/04328* (2013.01); *H01M 8/0258* (2013.01); *H01M 8/04007* (2013.01);
(Continued)

(58) Field of Classification Search
CPC .......... H01M 8/04328; H01M 8/0258; H01M 8/04007; H01M 8/0432; H01M 8/04335;
(Continued)

(56) References Cited

U.S. PATENT DOCUMENTS

2004/0247984 A1* 12/2004 Ismaier ............... H01M 8/0247
429/444
2006/0068250 A1*  3/2006 Bai ....................... H01M 8/248
429/511
(Continued)

FOREIGN PATENT DOCUMENTS

DE      2109034 A1    11/1972
JP    H01232670 A     9/1989

OTHER PUBLICATIONS

Translation of International Search Report for Application No. PCT/EP2021/071725 dated Nov. 26, 2021 (2 pages).

*Primary Examiner* — Christian Roldan
(74) *Attorney, Agent, or Firm* — Michael Best & Friedrich LLP

(57) ABSTRACT

The invention relates to a fuel cell stack (10) having a plurality of fuel cells (20) which have an inlet-side cathode port (22), anode port (24) and coolant port (26) and an outlet-side cathode port (23), anode port (25) and coolant port (27), wherein the fuel cell stack (10) also has: two end plates (30, 31) between which the plurality of fuel cells (20) are arranged, wherein at least one of the end plates (30, 31) has inlet openings (32, 34, 36) and outlet openings (33, 35, 37) for a cathode gas, an anode gas and a coolant, which are each fluidically connected to the inlet-side and outlet-side cathode ports (22, 23), anode ports (24, 25) and coolant ports (26, 27), and at least one sensor (50) which is guided through at least one additional opening (39) in at least one of the end plates (30, 31) into one of the inlet-side or outlet-side
(Continued)

cathode ports (22, 23), anode ports (24, 25) or coolant ports (26, 27). The invention also relates to a method for producing the fuel cell stack (10).

9 Claims, 2 Drawing Sheets

(51) Int. Cl.
    *H01M 8/04007*     (2016.01)
    *H01M 8/0438*     (2016.01)
    *H01M 8/04492*     (2016.01)
    *H01M 8/10*     (2016.01)

(52) U.S. Cl.
    CPC ..... *H01M 8/0432* (2013.01); *H01M 8/04335* (2013.01); *H01M 8/04343* (2013.01); *H01M 8/0435* (2013.01); *H01M 8/0438* (2013.01); *H01M 8/04492* (2013.01); *H01M 2008/1095* (2013.01)

(58) Field of Classification Search
    CPC ........... H01M 8/04343; H01M 8/0435; H01M 8/0438; H01M 8/04492; H01M 2008/1095; H01M 8/04067; H01M 8/247; H01M 8/2483; H01M 8/2432; Y02E 60/50
    USPC ......................................................... 429/434
    See application file for complete search history.

(56) References Cited

U.S. PATENT DOCUMENTS

| | | | |
|---|---|---|---|
| 2010/0143754 A1* | 6/2010 | Greszler | H01M 8/04302 429/458 |
| 2011/0274992 A1* | 11/2011 | Toida | H01M 8/04358 429/413 |
| 2013/0216927 A1* | 8/2013 | Gottmann | H01M 8/0271 429/432 |
| 2013/0295491 A1 | 11/2013 | Takeyama | |
| 2015/0180079 A1* | 6/2015 | Leger | H01M 8/04201 429/437 |
| 2019/0140302 A1* | 5/2019 | Lee | H01M 8/04746 |

\* cited by examiner

FUEL CELL STACK HAVING A SENSOR, AND METHOD USED FOR PRODUCING A FUEL CELL STACK HAVING THE SENSOR

BACKGROUND

Temperature and heat balance play a decisive role in the operation of polymer electrolyte fuel cell stacks in particular. The proton-conducting membrane must not dry out, but the water produced must be efficiently removed so as not to block the catalyst layer. Only by refined control of the gas flows according to the operating conditions and an exact knowledge and control of the gas and fuel cell temperatures is reliable operation possible.

It is known from the prior art to measure the anode and cathode gas temperatures outside the fuel cell stack, at the inputs and outputs thereof. Due to heat losses between the measuring points at the inputs and outputs and the actual gas inlets and outlets at the fuel cells, the measured temperatures do not correspond to the actually prevailing temperatures.

The temperature at the gas inlet of the fuel cell is generally lower than the temperature measured at the measurement site upstream of the fuel cell stack. The temperature at the gas outlet, on the other hand, is higher than the temperature measured at the measuring point downstream of the fuel cell stack. This systematic measurement error can only be achieved by means of a parameterized model which must be compensated with respect to, e.g., gas flows, temperatures, thermal masses and insulation, interaction with coolant, temperature, etc.

Therefore, it is desirable to provide a simple and reliable means in a fuel cell stack, by means of which it is possible to measure the actual temperatures and/or other parameters at the fuel cell inlets and outlets.

SUMMARY

The invention relates to a fuel cell stack having multiple fuel cells, two end plates, and a sensor, as well as a method used for manufacturing the fuel cell stack.

In this context, features and details described in connection with the fuel cell stack according to the invention also clearly apply in connection with the method according to the invention and the fuel cell system according to the invention, and vice versa, so, with respect to disclosure, mutual reference to the individual aspects of the invention is or can always be made.

Therefore, according to a first aspect, the invention relates to a fuel cell stack having multiple fuel cells, which comprise an input-side cathode port, anode port, and coolant port, as well as an output-side cathode port, anode port, and coolant port, wherein the fuel cell stack further comprises two end plates, between which the multiple fuel cells are arranged, wherein at least one of the end plates comprises inlet openings and outlet openings for a cathode gas, an anode gas, and a coolant, which openings are each fluidically connected to the input-side and output-side cathode ports, anode ports, and coolant ports, and at least one sensor, which is guided through at least one additional opening in at least one of the end plates and into one of the input-side or output-side cathode ports, anode ports, or coolant ports.

The at least one additional opening, i.e., via the input openings and output openings provided in the end plates for the movement of cathode gas, anode gas, and coolant, thus provides a particularly straightforward means of guiding the at least one sensor within one of the input-side or output-side cathode ports, anode ports, or coolant ports. In contrast to the sensor arrangement known from the prior art, e.g., a temperature sensor, outside the fuel cell stack, the parameters actually indicated in the fuel cell, e.g., the actual temperature, are measurable as a result. This approach eliminates the need for a complex parameterized model used to compensate for measurement errors.

It is possible that at least one of the end plates contains all the input openings and all the output openings or, e.g., one of the end plates contains some of the input openings and output openings, e.g., only the input openings, and the other of the end plates contains some of the input openings and output openings, e.g., only the output openings.

For example, the at least one sensor may comprise a sensor head for measuring the parameter predetermined by the type of sensor, whereby the sensor head may be arranged within one of the input-side or output-side cathode ports, anode ports, and coolant ports. The sensor head may be held within the respective port by means of a corresponding holding device and/or a sensor cable. The sensor may be connected, e.g., by means of the sensor cable, to a corresponding evaluation unit of the fuel cell stack or a fuel cell system comprising the fuel cell stack. The evaluation unit can accordingly evaluate the parameter measurement values detected by the sensor and, in particular, couple them back accordingly for operation of the fuel cell stack.

The ports may also be referred to as collection channels. They are formed by multiple recesses in fuel cells, or rather bipolar plates, in the fuel cells that are stacked on top of each other.

It may be provided that the fuel cell stack comprises six sensors, which are guided through each of various additional openings in at least one of the end plates and into one each of the input-side and output-side cathode ports, anode ports, and coolant ports. Accordingly, measurement values for the parameter being detected by the sensors may be detected on the input and output sides of the cathode port, the anode port, and the coolant port, and these values can be used for optimal operation of the fuel cell stack.

It can further be provided that the at least one additional opening extends transversely, in particular perpendicularly or substantially perpendicularly, to the input openings and output openings. Essentially, a tolerance-related deviation from a mathematically exact perpendicular is provided. For example, the input openings and output openings may be arranged on front longitudinal sides of the end plates, while the at least one additional opening is arranged on a bottom side or top side of the at least one end plate. These additional openings are thereby arranged in an area on the at least one end plate where the construction space necessary for said additional openings is available, in contrast to, e.g., the front-side longitudinal sides of the end plates. In particular, the at least one additional opening may be continuous, i.e., extending from one side of the end plate to the side opposite thereof.

It may otherwise be provided that the input-side and output-side cathode ports, anode ports, and coolant ports are fluidically connected to cell inputs and cell outputs for the cathode gas, the anode gas, and the coolant of the fuel cells, and the at least one sensor extends as far as one of the cell inputs or cell outputs. It is thus possible to detect the measurement value being detected by the at least one sensor directly at the respective cell input or cell output such that as little as possible or no deviation exists between the detected measurement value and the actual value of the parameter to be detected in the fuel cells. In this context, the cell inputs and cell outputs are understood to mean the inputs and outputs for the cathode gas, the anode gas, and the coolant located directly at the fuel cells, or rather the bipolar plates of the fuel cells.

It may be provided that the at least one sensor is a temperature sensor. In this regard, the temperature sensor enables detection of the temperature of the cathode gas, the anode gas, and/or the coolant at the respective port.

Alternatively or additionally, it may be provided that the at least one sensor is a moisture sensor. In this respect, said sensor is able to measure the moisture of the cathode gas, the anode gas, and/or the coolant at the respective port upstream of the fuel cells.

Furthermore alternatively or additionally, the at least one sensor may be a pressure sensor. In this respect, said sensor may measure the pressure of the cathode gas, the anode gas, and/or the coolant at the respective port upstream of the fuel cells.

In this context, it may also be provided that the sensor is a combined sensor capable of measuring at least two, or all, of the aforementioned parameters, i.e., temperature, moisture, and pressure. It is also possible to guide at least two, or all, of the aforementioned sensors through the additional opening. Accordingly, all of the aforementioned parameters may be used in order to optimize operation of the fuel cell stack.

Finally, it can also be provided that a quick coupling is arranged at the at least one additional opening, through which coupling the at least one sensor is guided. As a result, a conduit for supplying cathode gas, anode gas, and/or coolant may be coupled to the quick coupling in order to provide another means of supplying the corresponding gas or coolant.

According to a second aspect, the invention relates to a method used for manufacturing a fuel cell stack according to the first aspect of the invention, the method comprising the following steps:
  (a) stacking multiple fuel cells on top of one another,
  (b) positioning the multiple fuel cells, which are stacked on top of one another, relative to one another by means of positioning pins arranged in the input-side and output-side cathode ports, anode ports, and coolant ports,
  (c) bracing the multiple fuel cells, which are stacked and positioned relative to one another, between two end plates of the fuel cell stack,
  (d) removing the positioning pins from the input-side and output-side cathode ports, anode ports, and coolant ports by way of additional openings in at least one of the end plates, and
  (e) guiding at least one sensor through at least one of the additional openings, via which the positioning pins have been removed, and into one of the input-side or output-side cathode ports, anode ports, or coolant ports.

In this respect, the manufacturing method according to the invention relies upon additional openings, which are used for the guiding or insertion process, and then for the removal of positioning pins used for positioning and/or aligning the multiple fuel cells that are stacked on top of one another. These additional openings are used in the manufacturing method according to the invention for inserting the at least one sensor into the respective port. In particular, the method steps of the manufacturing method may be performed in numerical order.

It may in this case be provided that a sensor is guided through six additional openings in at least one of the end plates and into one each of the input-side and output-side cathode ports, anode ports, and coolant ports.

Further measures for improving the invention arise from the following description of various embodiments of the invention, which are schematically illustrated in the drawings. All of the features and/or advantages arising from the claims, description, or drawings, including structural details and spatial arrangements, may be essential to the invention, both by itself and in the various combinations.

BRIEF DESCRIPTION OF THE DRAWINGS

The invention will be explained in more detail in the following with reference to the accompanying drawings. Here.

Elements having the same function and mode of action are each provided with the same reference numbers in FIGS. 1 to 2.

DETAILED DESCRIPTION

Figure 1:
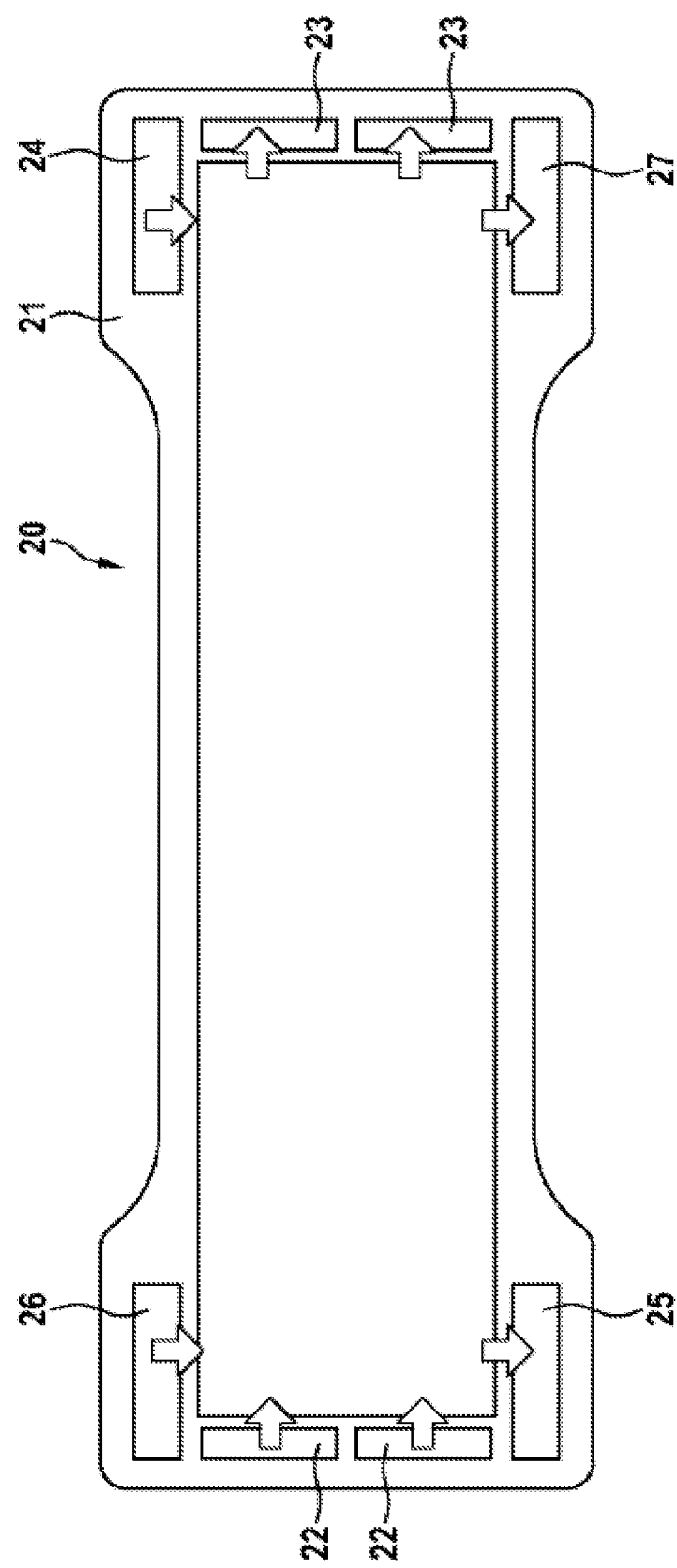
FIG. 1 shows an overhead view of a bipolar plate of a fuel cell of a fuel cell stack according to an exemplary embodiment of the present invention.
Figure 2:
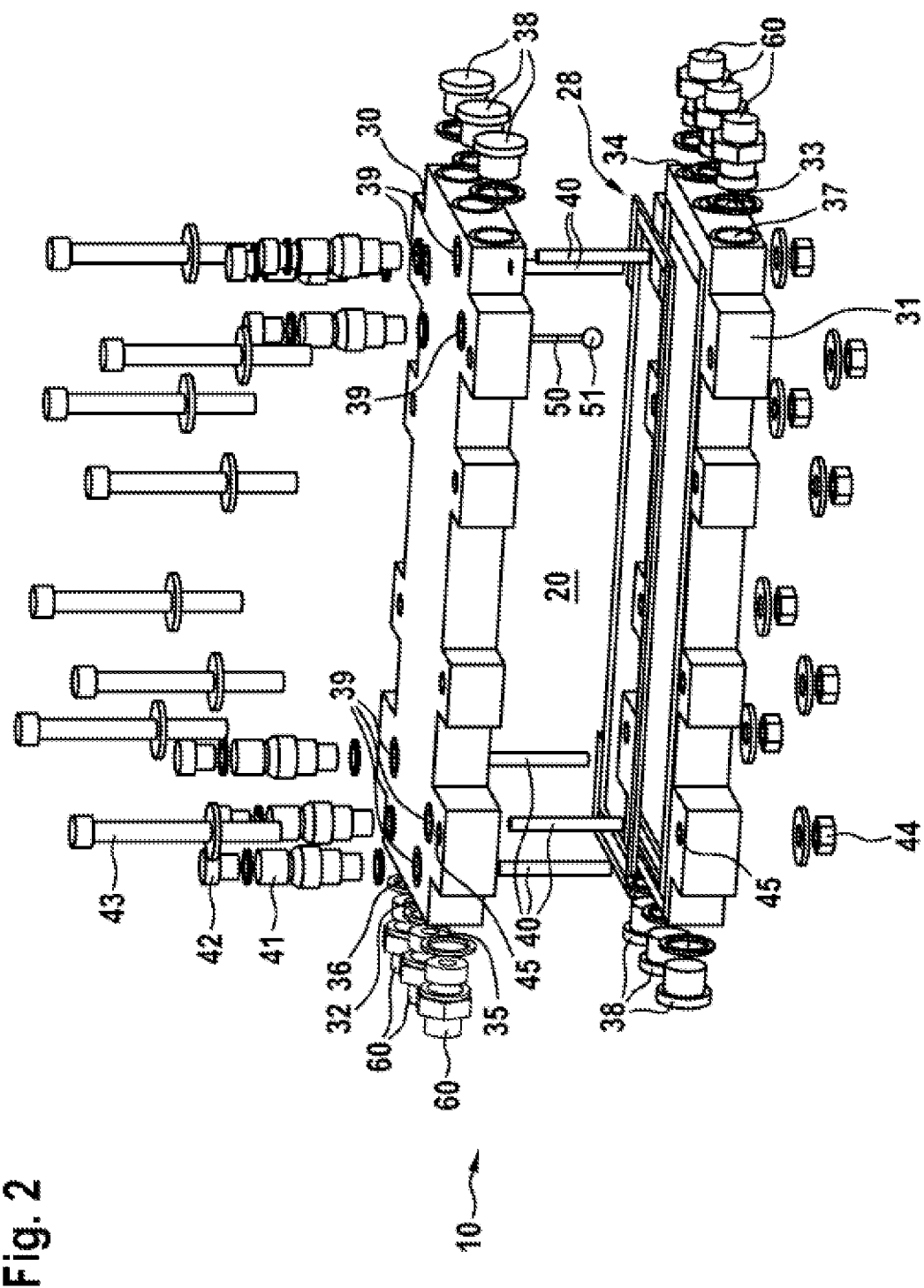
FIG. 2 shows an exploded view of a pair of end plates for receiving a fuel cell stack according to an exemplary embodiment of the invention during the manufacture of said fuel cell stack according to an exemplary embodiment of the manufacturing method.

FIG. 1 is an overhead view of a bipolar plate 21 as part of a fuel cell 20 in the fuel cell stack 10 shown in FIG. 2. Multiple fuel cells 20 having bipolar plates 21 are in this case stacked one on top of the other and positioned relative to each other such that ports 22, 23, 24, 25, 26, 27 are formed in the corresponding recesses of the bipolar plates 21. These ports 22, 23, 24, 25, 26, 27 may also be referred to as collection passages, through which an anode gas, a cathode gas, and a coolant flows during operation of the fuel cell stack 10.

The port 22 in this case represents an input-side cathode port 22 in the bipolar plate 21 shown in FIG. 1. Port 23 represents an output-side cathode port 23. The flow of the cathode gas from the input-side cathode port 22 to the output-side cathode port 23 is characterized by corresponding arrows. Furthermore, port 24 represents an input-side anode port 24, port 25 represents an output-side anode port 25, port 26 represents an input-side coolant port 26, and port 27 represents an output-side coolant port 27. The flow directions of the anode gas and the coolant are also indicated by corresponding arrows at ports 24, 25, 26, 27. In the present case, the configuration of ports 22, 23, 24, 25, 26, 27 in the end plates 30, 31 is chosen only by way of example and may also be chosen differently.

FIG. 2 is an exploded view of a pair of end plates for receiving a fuel cell stack 10 having multiple fuel cells 20, which are braced between two end plates 30, 31. For the sake of clarity, the fuel cells 20 are not shown in FIG. 2, but only indicated by their corresponding reference number.

The end plate 30 in this case comprises an input opening 32 for the cathode gas, which opening is fluidically connected to the input-side cathode port 22. The end plate 30 further comprises an input opening 36 for the coolant, which opening is fluidically connected to the input-side coolant port 26. The end plate 30 further comprises an output opening 35 for the anode gas, which opening is fluidically connected to the output-side anode port 25.

The end plate 31 located below the end plate 30 in turn comprises an input opening 34 for the anode gas, which opening is fluidically connected to the input-side anode port 24. The end plate 31 further comprises an output opening 33 for the cathode gas, which opening is fluidically connected to the output-side cathode port 23. The end plate 31 further comprises an output opening 37 for the coolant, which opening is fluidically connected to the output-side coolant port 27.

The input openings 32, 34, 36 and output openings 33, 35, 37 are each provided with corresponding threaded sleeves 37, to which corresponding conduits, not shown, for the cathode gas, anode gas, and coolant may be connected. The input openings 32, 34, 36 and output openings 33, 35, 37 are each located on front longitudinal sides of the end plates 30, 31. Corresponding locking screws 38 are located on the opposing longitudinal sides of the front face.

The end plate 30 comprises multiple, in the present case six, additional openings 39. These additional openings 39 extend in a direction perpendicular to the input openings 32, 34, 36 and output openings 33, 35, 37. During manufacture of the fuel cell stack 10, positioning pins 40 are guided through these additional openings 39 via ports 22, 23, 24, 25, 26, 27 in order to correctly position the fuel cells 20, which are located between the end plates 30, 31, relative to each other in an installed position between the end plates 30, 31. A seal 28 for the plurality of fuel cells 20 between the end plates 30, 31 is shown in order to indicate how the positioning pins 40 are arranged within ports 22, 23, 24, 25, 26, 27. The end plates 30, 31 are attached to the fuel cells 20, which are located between said end plates, by corresponding screws 43 and washers 44 via the through-holes 45 in the end plates 30, 31.

The positioning pins 40 are then removed from the additional openings 39. Prior to or subsequent to this, quick couplings 41 may be arranged on the additional openings 39. These couplings may be sealed using corresponding adapters 42. Corresponding conduits can thus be connected to the quick couplings 41 for an additional supply of cathode gas, anode gas, or coolant.

In any case, sensors 50 are guided through the quick couplings 41 or additional openings 39, which sensors may be configured as, e.g., temperature sensors. By way of example, FIG. 2 shows such a sensor 50 within the output-side coolant port 27 (purely schematically, with a sensor head 51). In the other ports 22, 23, 24, 25, 26, on the other hand, the positioning pins 40 are still shown.

By means of the sensor 50, the temperature, or another parameter, of the coolant at the output of the fuel cells 20 in the fuel cell stack 10 can thus be sensed directly within the coolant port 27. Furthermore, the other ports 22, 23, 24, 25, 26 may also comprise a sensor 50 that is guided through the respective additional openings 39 such that the coolant can also be measured on the input side, and the anode gas and the cathode gas can be measured on both the input side and the output sides. As a result, operation of the fuel cell stack 10 can be designed to be optimized correspondingly based on the measurement values of the sensors 50.

The invention claimed is:

1. A fuel cell stack (10) having multiple fuel cells (20), which comprise an input-side cathode port (22), an input-side anode port (24), and an input-side coolant port (26), and an output-side cathode port (23), an output-side anode port (25), and an output-side coolant port (27), wherein the fuel cell stack (10) further comprises: #
   (a) two end plates (30, 31), between which the multiple fuel cells (20) are arranged, wherein at least one of the two end plates (30, 31) comprises input openings (32, 34, 36) and output openings (33, 35, 37) for a cathode gas, an anode gas, and a coolant, wherein the input and output openings (32, 33, 34, 35, 36, 37) are each respectively fluidically connected to one of the input-side and output-side cathode ports (22, 23), anode ports (24, 25), and coolant ports (26, 27), and #
   (b) at least one sensor (50), which is guided through at least one additional opening (39) in the two end plates (30, 31) and into one of the input-side or output-side cathode ports (22, 23), anode ports (24, 25), or coolant ports (26, 27).

2. The fuel cell stack (10) according to claim 1, wherein the fuel cell stack (10) comprises six sensors (50), which are guided through respective additional openings (39) in at least one of the two end plates (30, 31) and into one each of the input-side and output-side cathode ports (22, 23), anode ports (24, 25), and coolant ports (26, 27).

3. The fuel cell stack (10) according to claim 1, wherein the at least one additional opening (39) extends transversely to the input openings (32, 34, 36) and output openings (33, 35, 37).

4. The fuel cell stack (10) according to claim 1, wherein the at least one sensor (50) is a temperature sensor.

5. The fuel cell stack (10) according to claim 1, wherein the at least one sensor (50) is a moisture sensor.

6. The fuel cell stack (10) according to claim 1, wherein the at least one sensor (50) is a pressure sensor.

7. A method used for manufacturing a fuel cell stack (10) according to claim 1, wherein the method comprises the following steps: #
   (a) stacking the multiple fuel cells (20) on top of one another, #
   (b) positioning the multiple fuel cells (20), which are stacked on top of one another, relative to one another by means of positioning pins (40) arranged in the input-side and output-side cathode ports (22, 23), anode ports (24, 25), and coolant ports (26, 27), #
   (c) bracing the multiple stacked fuel cells (20), which are positioned in relation to one another, between the two end plates (30, 31) of the fuel cell stack (10), #
   (d) removing the positioning pins (40) from the input-side and output-side cathode ports (22, 23), anode ports (24, 25), and coolant ports (26, 27) by way of the at least one additional opening (39) in at least one of the two end plates (30, 31), and #
   (e) guiding at least one sensor (50) through the at least one additional opening (39), via which the positioning pins (40) have been removed, and into one of the input-side or output-side cathode ports (22, 23), anode ports (24, 25), or coolant ports (26, 27).

8. The method according to claim 7, wherein the at least one sensor (50) is guided through six additional openings (39) in at least one of the end plates (30, 31) and into one each of the input-side and output-side cathode ports (22, 23), anode ports (24, 25), and coolant ports (26, 27).

9. The fuel cell stack (10) according to claim 3, wherein the at least one additional opening (39) extends perpendicularly or substantially perpendicularly to the input openings (32, 34, 36) and output openings (33, 35, 37). #.

* * * * *